(12) United States Patent
Mizutani (10) Patent No.: US 7,695,540 B2
(45) Date of Patent: Apr. 13, 2010

(54) PLUGGED HONEYCOMB STRUCTURE

(75) Inventor: Takashi Mizutani, Tokoname (JP)

(73) Assignee: NGK Insulators, Ltd., Nagoya (JP)

( * ) Notice: Subject to any disclaimer, the term of this patent is extended or adjusted under 35 U.S.C. 154(b) by 550 days.

(21) Appl. No.: 11/653,223

(22) Filed: Jan. 16, 2007

(65) Prior Publication Data

US 2007/0180804 A1 Aug. 9, 2007

(30) Foreign Application Priority Data

Feb. 7, 2006 (JP) ............................. 2006-029522

(51) Int. Cl.
*B01D 39/00* (2006.01)
*B01D 39/14* (2006.01)
*B01D 39/06* (2006.01)
*B01D 50/00* (2006.01)
*B01J 23/00* (2006.01)

(52) U.S. Cl. .......................... 55/523; 55/522; 55/524; 422/177; 422/178; 422/179; 422/180; 422/181; 422/182; 502/303

(58) Field of Classification Search ........... 55/522–524; 422/177–182; 502/303
See application file for complete search history.

(56) References Cited

U.S. PATENT DOCUMENTS

| | | | | |
|---|---|---|---|---|
| 4,519,820 A * | 5/1985 | Oyobe et al. | .................. | 55/284 |
| 7,033,452 B2 * | 4/2006 | Yamada et al. | ............ | 156/89.22 |
| 7,504,359 B2 * | 3/2009 | Ogyu et al. | .................. | 502/439 |
| 2005/0175514 A1 * | 8/2005 | Ohno | .......................... | 422/177 |
| 2005/0229565 A1 | 10/2005 | Yoshida | | |
| 2006/0029769 A1 | 2/2006 | Ichikawa et al. | | |
| 2006/0225390 A1 * | 10/2006 | Yoshida | ...................... | 55/523 |
| 2007/0065348 A1 * | 3/2007 | Ohno et al. | .................. | 422/178 |
| 2007/0116908 A1 * | 5/2007 | Ohno et al. | ................. | 428/34.4 |
| 2007/0169453 A1 * | 7/2007 | Hayakawa | .................. | 55/523 |
| 2007/0180804 A1 * | 8/2007 | Mizutani | ..................... | 55/523 |

FOREIGN PATENT DOCUMENTS

| | | |
|---|---|---|
| JP | A 2001-269585 | 10/2001 |
| JP | A 2002-309922 | 10/2002 |
| JP | A 2005-172652 | 6/2005 |
| KR | 2005-75040 | 7/2005 |

* cited by examiner

*Primary Examiner*—Walter D Griffin
*Assistant Examiner*—Amber Orlando
(74) *Attorney, Agent, or Firm*—Oliff & Berridge, PLC (57) ABSTRACT

There is disclosed a plugged honeycomb structure capable of suppressing a rise of a pressure loss. A plugged honeycomb structure 1 of the present invention comprises a columnar honeycomb structure 2 having porous partition walls 4 and a plurality of cells 5 which are defined by the partition walls 4 and which extend through the structure from one end surface 7a to the other end surface 7b thereof; a plurality of first plugging members 3a which plug openings of predetermined cells 5a on a side of the one end surface 7a; and a plurality of second plugging members 3b which plug openings of the remaining cells 5b on a side of the other end surface 7b. In the plugged honeycomb structure 1, the first plugging member 3a includes a convex portion 6 having a shape convex toward the center of the cell 5 in an axial direction on an end portion of the member on a side opposite to the end surface 7a in which the cell 5a to be plugged is opened.

8 Claims, 4 Drawing Sheets

PLUGGED HONEYCOMB STRUCTURE

BACKGROUND OF THE INVENTION

1. Field of the Invention

The present invention relates to a plugged honeycomb structure. The present invention more particularly relates to a plugged honeycomb structure which is capable of suppressing an increase of a pressure loss and which is useful as a trapping filter for an exhaust gas, especially a diesel particulate filter (DPF) to trap particulate matter (particulate) and the like in an exhaust gas of a diesel engine.

2. Description of the Related Art

A honeycomb structure having porous partition walls is broadly used in a filter, a catalyst carrier or the like, and is broadly used especially as a catalyst carrier, a filter or the like for purifying or treating an exhaust gas of an internal combustion engine such as a gasoline engine or a diesel engine, or a combustion device.

The exhaust gas discharged from an internal combustion engine such as the diesel engine includes a large amount of particulate matter (particulate) containing, as a main component, carbon which is a cause for environmental contamination. Therefore, a filter for trapping the particulate matter (particulate) such as a diesel particulate filter (DPF) is sometimes mounted in an exhaust system of the engine.

Figure 6:
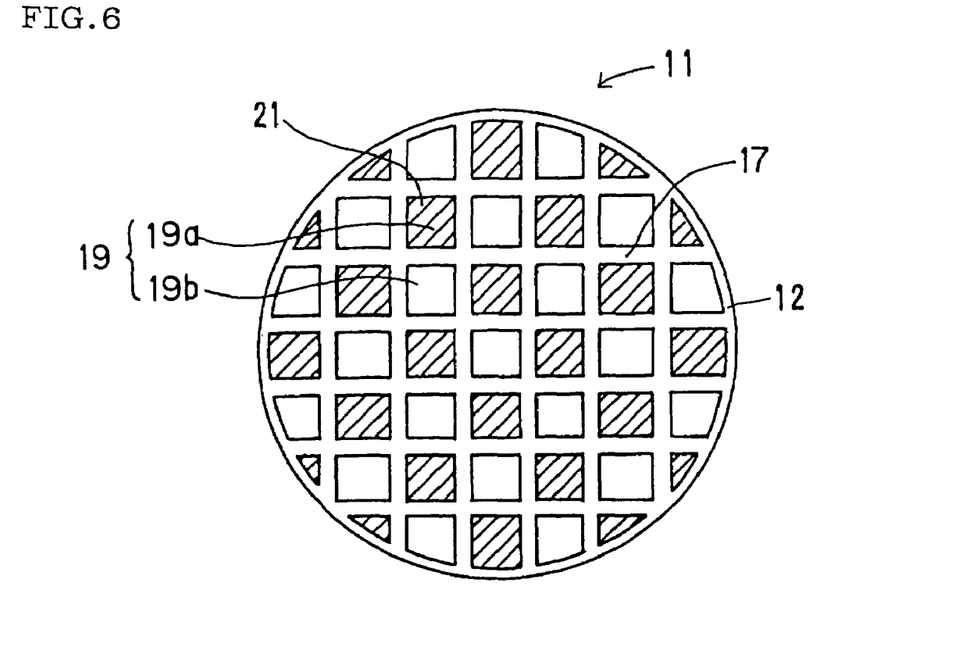
FIG. 6 is a schematic explanatory view showing a constitution of a plugged honeycomb structure for use as a filter, and is a plan view viewed from a side of one end surface of the plugged honeycomb structure.
Figure 7:
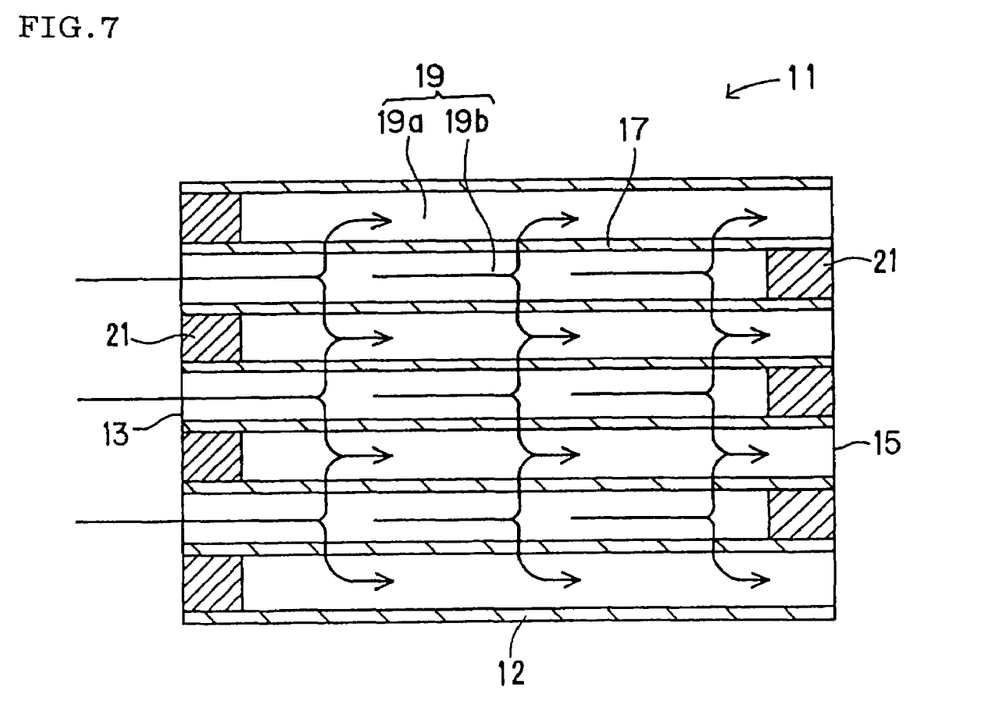
FIG. 7 is a sectional view of the plugged honeycomb structure shown in FIG. 6.

In general, examples of the honeycomb structure to be used for such a purpose include, as shown in FIGS. 6 and 7, a honeycomb structure 12 having a plurality of cells (circulation holes) 19 partitioned by porous partition walls 17 and extending through the structure in an axial direction; and a plugged honeycomb structure 11 in which one end portion of each predetermined cell 19a is plugged with a plugging portion 21 constituted of a plugging material filled in this cell 19 and in which an end portion of each remaining cell 19b on a side opposite to the plugged end portion of the predetermined cell 19a is plugged with the plugging portion 21 (see, e.g., Patent Document 1).

The exhaust gas flows into a filter constituted of such a honeycomb structure (the plugged honeycomb structure 11) from one end surface 13, and flows out of the other end surface 15 after the particulate matter included in the gas and the like are removed.

Specifically, the exhaust gas flows into the cells 19b whose end portions in the inflow-side end surface 13 of this filter are not plugged and whose end portions in the outflow-side end surface 15 are plugged, flows through the porous partition walls 17, moves to the cells 19a whose end portions in the inflow-side end surface 13 are plugged and whose end portions in the outflow-side end surface 15 are not plugged, and is discharged from the cells 19a.

Moreover, in this case, the partition walls 17 constitute filtering layers, and the particulates in the exhaust gas are trapped by the partition walls 17 and deposited on the partition walls 17.

In recent years, increase of porosities of the partition walls of the honeycomb structure and thinning of the walls have advanced in order to reduce a pressure loss at a time when the exhaust gas is treated with the honeycomb structure and treat the exhaust gas more efficiently.

Moreover, as a method of avoiding a rapid increase of the pressure loss due to the deposited particulate matter, there is proposed a plugged honeycomb structure in which a plugging member is provided with a protruding portion protruding in a shape tapered from the end surface of the cell toward an upstream side (see, e.g., Patent Document 2).

[Patent Document 1] Japanese Patent Application Laid-Open No. 2001-269585

[Patent Document 2] Japanese Patent Application Laid-Open No. 2002-309922

However, even in such a conventional plugged honeycomb structure, it cannot be said that an effect of suppressing the increase of the pressure loss is sufficiently exhibited. There has also been a problem concerning improvements of a treating property, an impact resistance and the like.

Moreover, in order to reduce a fuel consumption of the engine and treat the exhaust gas efficiently, it is necessary to reduce the pressure loss of the plugged honeycomb structure in an initial state, that is, in a state in which any particulates or the like is not attached, and there is demanded development of the plugged honeycomb structure in which the pressure loss in the initial state is reduced in this manner.

SUMMARY OF THE INVENTION

The present invention has been developed in view of such a problem of the conventional technology, and there is provided a plugged honeycomb structure capable of suppressing an increase of a pressure loss in a case where a fluid is passed.

As a result of an intensive study to solve the above-described problem, the inventors have found that in the conventional plugged honeycomb structure, an end portion (the end portion on a side of the center of a cell in an axial direction) of a plugging member on a side opposite to an end surface in which the cell is opened has a flat shape or a shape recessed toward the inside of the plugging member, and such a shape of the end portion of the plugging member is a cause for a rapid rise of the pressure loss of the plugged honeycomb structure.

Therefore, it has been found that the above object can be achieved in a case where the plugging member to plug an opening of the cell includes a convex portion having a shape convex toward the center of the cell in the axial direction on the end portion (the end portion on the side of the center of the cell in the axial direction) of the member on the side opposite to the end surface in which the cell to be plugged is opened, and the present invention has been completed.

That is, according to the present invention, there is provided the following plugged honeycomb structure.

[1] A plugged honeycomb structure comprising: a columnar honeycomb structure having porous partition walls and a plurality of cells which are defined by the partition walls and which extend through the structure from one end surface to the other end surface thereof; a plurality of first plugging members which plug openings of predetermined cells on a side of the one end surface; and a plurality of second plugging members which plug openings of the remaining cells on a side of the other end surface, wherein the first plugging member on the side of the one end surface includes a convex portion having a shape convex toward the center of the cell in an axial direction on an end portion of the member on a side opposite to the end surface in which the cell to be plugged is opened.

[2] The plugged honeycomb structure according to the above [1], wherein the convex portion of the first plugging member is constituted of a curved surface having a predetermined curvature, and has the shape which is convex toward the center of the cell in the axial direction.

[3] The plugged honeycomb structure according to the above [1] or [2], wherein the second plugging member on the side of the other end surface includes a convex portion having a shape convex toward the center of the cell in the axial direction on an end portion of the member on a side opposite to the end surface in which the cell to be plugged is opened.

[4] The plugged honeycomb structure according to the above [3], wherein the convex portion of the second plugging member is constituted of a curved surface having a predetermined curvature, and has the shape which is convex toward the center of the cell in the axial direction.

[5] The plugged honeycomb structure according to any one of the above [1] to [4], wherein a length from a hem portion to a vertex portion of the convex portion is larger than 0 mm, and smaller than 3 mm.

[6] The plugged honeycomb structure according to any one of the above [1] to [5], wherein a length from a hem portion to a vertex portion of the convex portion is larger than 0 mm, and smaller than 1 mm.

In the plugged honeycomb structure of the present invention, each plugging member that plugs the opening of the cell includes the convex portion having the shape convex toward the center of the cell in the axial direction on the end portion of the plugging member on the side opposite to the end surface in which the cell to be plugged is opened. Therefore, it is possible to suppress a rise of a pressure loss in a case where a fluid is passed.

NUMERALS

1: plugged honeycomb structure, 2: honeycomb structure, 3: plugging member, 3a: first plugging member, 3b: second plugging member, 4: partition wall, 5: cell, 5a: predetermined cell, 5b: remaining cell, 6: convex portion, 7a: one end surface (end surface), 7b: other end surface (end surface), 8: vertex portion, 9: hem portion, 11: plugged honeycomb structure, 12: honeycomb structure, 13: end surface (inflow-side end surface), 15: end surface (outflow-side end surface), 19: cell, 19a: cell (predetermined cell), 19b: cell (remaining cell), 21: plugging portion, A: region where a plugging member is arranged in an opening of the cell on the inlet side, B: region where any plugging member is not arranged, C: region where a plugging member is arranged in an opening of the cell on the outlet side, P: line denoting a pressure in the cell in a case where the opening of the cell on the inlet side is opened and the opening of the cell on the outlet side is provided with the plugging member, Q: line denoting a pressure in the cell in a case where the opening of the cell on the inlet side is provided with the plugging member and the opening of the cell on the outlet side is opened, X: length from a hem portion to a vertex portion of a convex portion of a plugging member and Y: plugging depth.

DESCRIPTION OF THE PREFERRED EMBODIMENT

An embodiment of a plugged honeycomb structure of the present invention will be described hereinafter, but it should be understood that the present invention is not limited to the following embodiment, and the following embodiment appropriately changed or modified based on ordinary knowledge of those skilled in the art is also included in the scope of the present invention.

Figure 1:
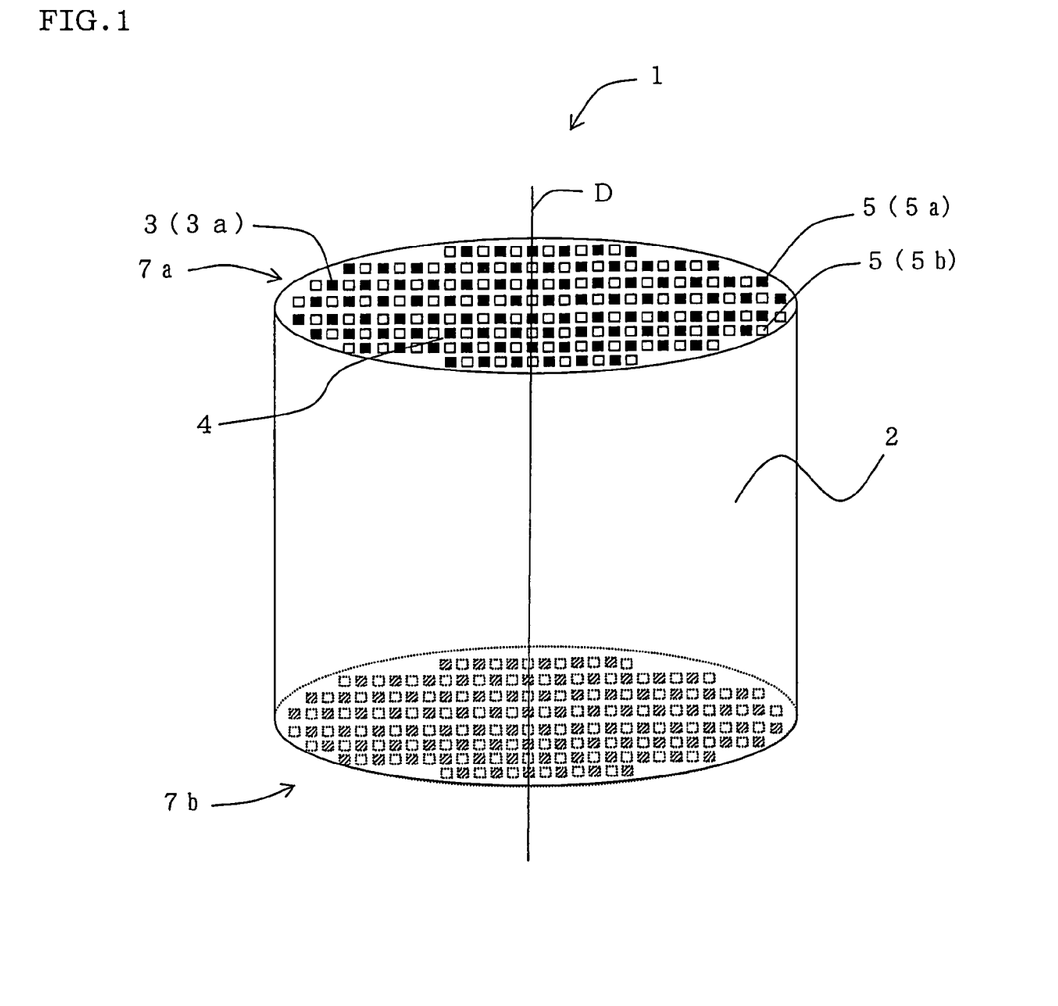
FIG. 1 is a perspective view schematically showing one embodiment of a plugged honeycomb structure of the present invention.
Figure 2:
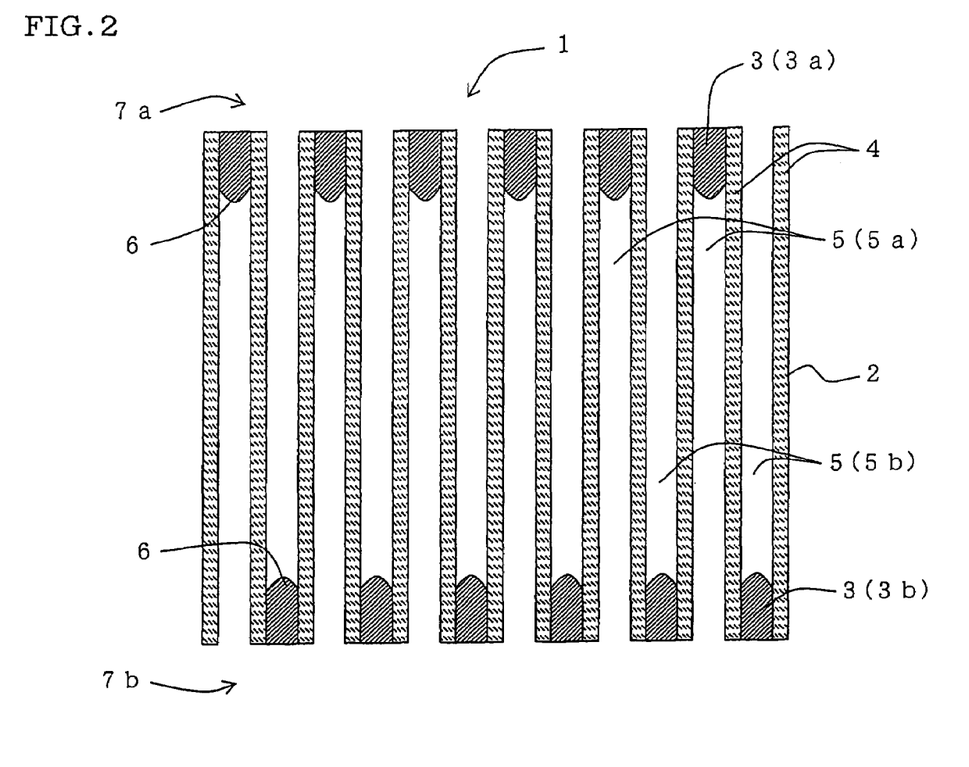
FIG. 2 is a sectional view cut along a plane D of the plugged honeycomb structure shown in FIG. 1.
Figure 3:
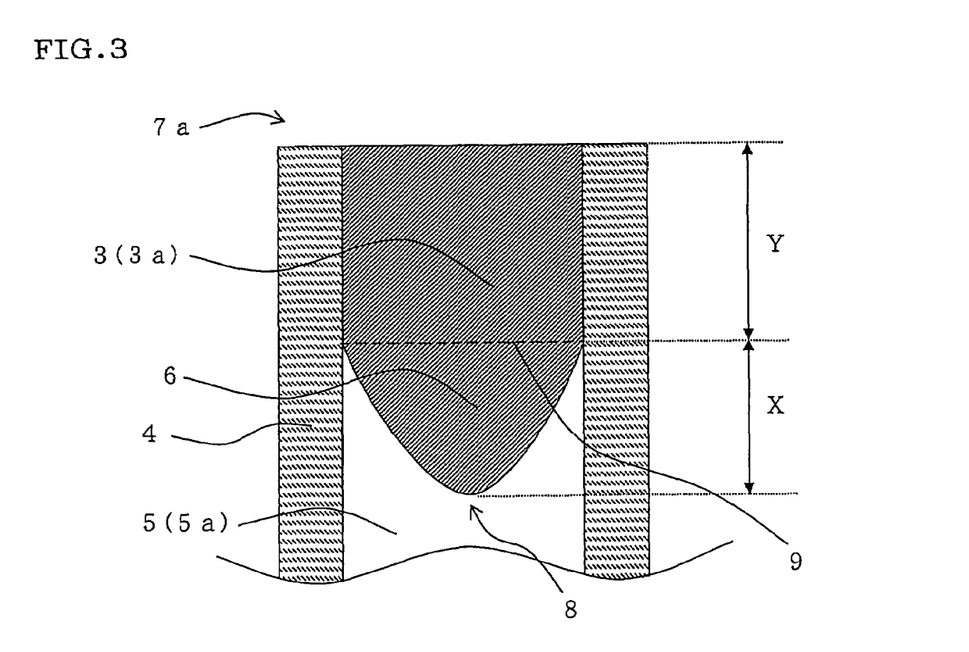
FIG. 3 is an enlarged sectional view of one end portion of the plugged honeycomb structure shown in FIG. 2.

FIG. 1 is a perspective view schematically showing one embodiment of a plugged honeycomb structure of the present invention, FIG. 2 is a sectional view cut along a plane D of the plugged honeycomb structure shown in FIG. 1, and FIG. 3 is an enlarged sectional view of one end portion of the plugged honeycomb structure shown in FIG. 2.

As shown in FIGS. 1 to 3, a plugged honeycomb structure 1 of the present embodiment includes a columnar honeycomb structure 2 having porous partition walls 4 and a plurality of cells 5 defined by the partition walls 4 and extending through the structure from one end surface 7a to the other end surface 7b thereof; a plurality of first plugging members 3a which plug openings of predetermined cells 5a on a side of the one end surface 7a; and a plurality of second plugging members 3b which plug openings of remaining cells 5b on a side of the other end surface 7b. In the plugged honeycomb structure 1, each first plugging member 3a includes a convex portion 6 having a shape which is convex toward the center of the cell 5 in an axial direction on an end portion of the member on a side opposite to the one end surface 7a in which the cell 5a to be plugged is opened.

According to this constitution, it is possible to suppress a rise of a pressure loss in a case where a fluid is passed through the cells 5.

The above-described axial direction of the cell 5 means a direction in which the cell 5 extends through the columnar honeycomb structure 2 from the one end surface 7a to the other end surface 7b.

Moreover, in the plugged honeycomb structure 1 of the present embodiment, at least the first plugging members 3a may have the convex portions 6. However, for example, each second plugging member 3b on the side of the other end surface 7b may have the convex portion 6 which is convex toward the center of the cell 5 in the axial direction on an end portion of the member on a side opposite to the end surface 7b in which the cell 5b to be plugged is opened.

According to such a constitution, even if the fluid is passed from either the one end surface 7a or the other end surface 7b, the rise of the pressure loss can effectively be suppressed.

Here, there will be described a change of a pressure in each cell 5 in a case where the fluid passes through the cell 5 of the plugged honeycomb structure 1.

Figure 4:
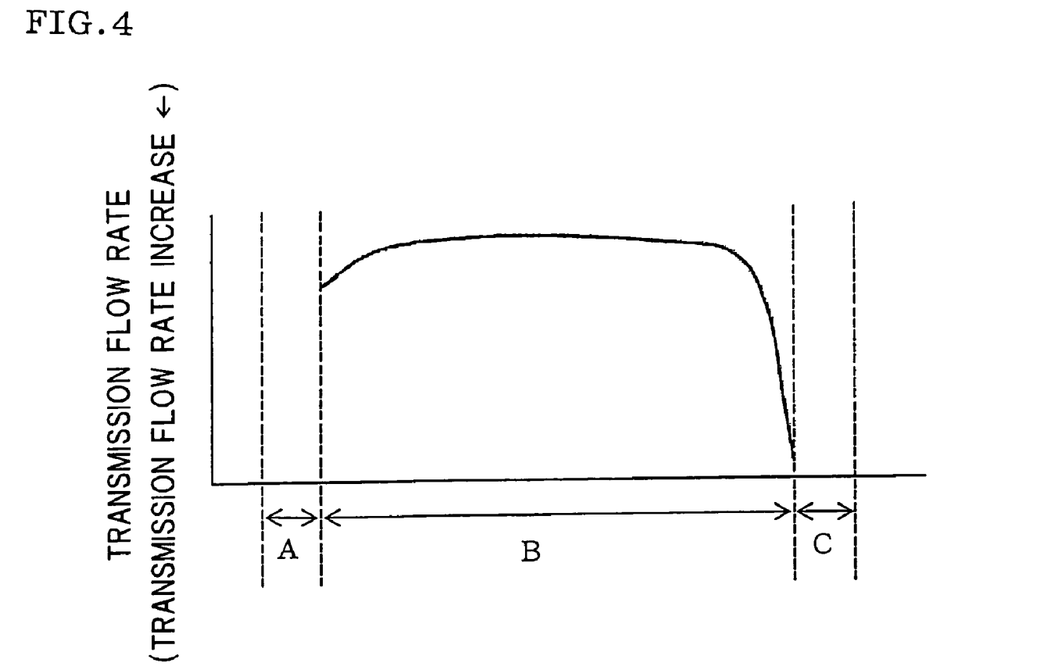
FIG. 4 is a graph showing a flow rate distribution in a case where a fluid flowing into cells passes through partition walls of a honeycomb structure in a conventional plugged honeycomb structure.

FIG. 4 is a graph showing a flow rate distribution in a case where the fluid flowing into the cells passes through the partition walls of a honeycomb structure in a conventional plugged honeycomb structure. The abscissa axis shows positions of the cells from an inlet side to an outlet side, and the ordinate axis shows a flow rate (a transmission flow rate) in a case where the fluid passes through the cells.

It is to be noted that the abscissa indicates that the transmission flow rate increases toward a lower side of the graph.

Figure 5:
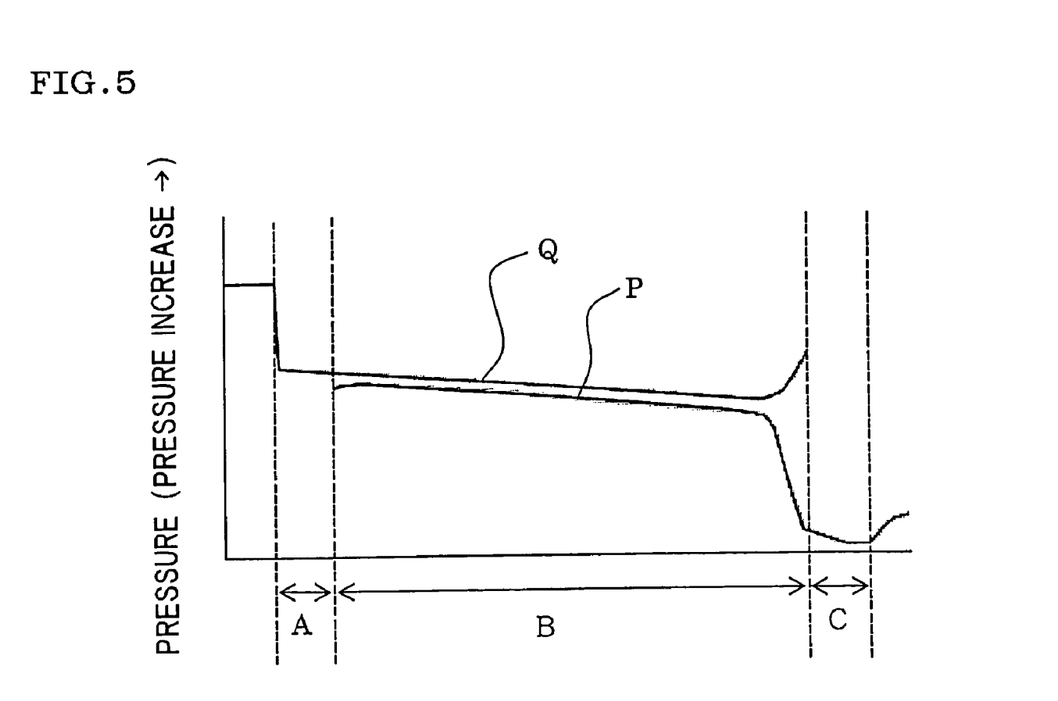
FIG. 5 is a graph showing a pressure distribution of a fluid in cells of a conventional plugged honeycomb structure.

Moreover, FIG. 5 is a graph showing a pressure distribution of the fluid flowing into the cells of the conventional plugged honeycomb structure. The abscissa axis indicates the positions of the cells from the inlet side to the outlet side, and the ordinate axis indicates a pressure change of the fluid.

It is to be noted that the abscissa axis indicates that the pressure increases toward an upper side of the graph.

In the graphs of FIGS. 4 and 5, a range denoted with A along the abscissa axis indicates a region where a plugging member is arranged in an opening of the cell on the inlet side, a range denoted with C indicates a region where a plugging member is arranged in an opening of the cell on the outlet side, and a range denoted with B indicates a region where any plugging member is not arranged.

Moreover, in the graph of FIG. 5, a line denoted with P indicates a pressure in the cell in a case where the opening of the cell on the inlet side is opened and the opening of the cell on the outlet side is provided with the plugging member, and a line denoted with Q indicates a pressure in the cell in a case where the opening of the cell on the inlet side is provided with the plugging member and the opening of the cell on the outlet side is opened.

As shown in FIG. 4, it is seen that the transmission flow rate of the fluid is very fast in the vicinity of the outlet side of the cell in the conventional plugged honeycomb structure.

As shown in FIG. 5, the pressure of the fluid in the vicinity of the outlet side of the cell largely drops owing to an influence of this flow rate distribution, and this is a cause for a pressure difference (i.e., the pressure loss) between the inlet side and the outlet side.

As described above, in the plugged honeycomb structure of the present embodiment shown in FIGS. 1 to 3, at least the first plugging members 3a, preferably both of the first plugging members 3a and the second plugging members 3b have the convex portions 6 each having the shape convex toward the center of the cell 5 in the axial direction on the end portions of the members on the side opposite to the end surface in which the cell 5 to be plugged is opened. The plugged honeycomb structure 1 is arranged so that, for example, the one end surface 7a is an outflow side of the fluid. In this case, an area (hereinafter referred to as "the cell sectional area") in a section of the cell 5 vertical to the axial direction in the vicinity of the outlet side of the cell 5 is reduced to decrease a flow rate of the fluid in the vicinity of the outlet side, and the transmission flow rate in the vicinity of this outlet side can be delayed.

In consequence, the pressure of the fluid in the vicinity of the outlet side rises, and the pressure difference between the inlet side and the outlet side of the cell can be reduced to suppress the rise of the pressure loss.

Moreover, when the second plugging members 3b also has the convex portions 6, it is possible to suppress the rise of the pressure loss during counter cleaning or the like performed in regenerating a filter or the like.

Furthermore, in the plugged honeycomb structure 1 of the present embodiment, it is preferable that the convex portion 6 of each plugging member 3 (the first plugging member 3a and/or the second plugging member 3b) is constituted of a curved surface having a predetermined curvature, and has a shape which is convex toward the center of the cell 5 in the axial direction.

As described above, since the convex portion 6 of the plugging member 3 has a shape constituted of the curved surface having the predetermined curvature, disturbance does not easily occur in the flow of the fluid in a case where the fluid flows into a position provided with the convex portion 6. Therefore, the pressure rise due to current transformation of the fluid can be suppressed.

It is preferable that the convex portion 6 is constituted of a comparatively smooth curved surface so that the fluid more orderly flows in a case where the convex portion 6 is formed into the shape having the predetermined curvature as described above.

A specific value of the curvature can appropriately be determined in accordance with a size of the whole plugged honeycomb structure 1, a length of the cell 5, a size of the opening, a use purpose of the plugged honeycomb structure 1 or the like.

A length X (see FIG. 3) from a hem portion 9 to a vertex portion 8 of the convex portion 6 of the plugging member 3 is preferably larger than 0 mm, and smaller than 3 mm, and further preferably larger than 0 mm, and smaller than 1 mm.

In a case where the length X is 3 mm or more, since an effective volume of the cell decreases, a pipeline passage loss (the Hagen Poiseuille loss) rises. Therefore, the pressure loss sometimes rises.

Furthermore, in order to set the length X from the hem portion 9 to the vertex portion 8 of the convex portion 6 of the plugging member 3 to 3 mm or more, an amount of a moisture of a pasted plugging slurry which is a material of the plugging member 3 needs to be increased, a porosity of the plugging member 3 excessively lowers, and a rigidity of the plugging member 3 increases. Therefore, during the regeneration, the plugging member is sometimes cracked.

In addition, although not especially restrictive, a substantial minimum value of the length X from the hem portion 9 to the vertex portion 8 of the convex portion 6 of the plugging member 3 is, for example, 0.01 mm. If the length is smaller than this value, the above-described effect is not sufficiently obtained. Although not especially restrictive, it is preferable that the above length X is 0.1 mm or more. It is to be noted that in FIG. 3, Y is a plugging depth.

The honeycomb structure 2 of the plugged honeycomb structure 1 in the present embodiment is the columnar honeycomb structure 2 having the porous partition walls 4, and a plurality of cells 5 which are defined by the partition walls 4 and which extend through the structure from the one end surface 7a to the other end surface 7b thereof. There can preferably be used a honeycomb structure constituted in the same manner as in a honeycomb structure for use in a known conventional plugged honeycomb structure.

As a material of the honeycomb structure 2, from viewpoints of strength and heat resistance, it is preferable to use at least one selected from the group consisting of silicon carbide, a silicon-silicon carbide based composite material, silicon nitride, cordierite, mullite, alumina, spinel, a silicon carbide-cordierite based composite material, a silicon-silicon carbide composite material, lithium aluminum silicate, aluminum titanate and an Fe—Cr—Al based metal.

There is not any special restriction on a shape of the honeycomb structure 2. Examples of a shape of a section of the honeycomb structure which is vertical to a central axis of a columnar structure may include a polygonal shape such as a quadrangular shape, a circular shape, an elliptic shape, an oblong shape and an irregular shape, and the like.

Moreover, there is not any special restriction on the sectional shape of the cell 5 vertical to the axial direction, and examples of the shape may include a triangular shape, a quadrangular shape, a hexagonal shape, an octagonal shape, a circular shape and a shape obtained by combining these shapes.

It is to be noted that all the cells 5 do not need to have an equal area of the opening of the cell 5, and the cells 5 having different opening areas may be mixed.

Furthermore, there is not any special restriction on a cell density of the honeycomb structure 2. However, if the cell density is excessively small, a strength and an effective GSA (geometric surface area) of the structure as the filter come short. If the cell density is excessively large, the pressure loss in a case where a fluid to be treated flows increases.

The cell density is preferably in a range of 0.9 to 311 cells/cm$^2$ (6 to 2000 cells/square inch), further preferably 7.8 to 155 cells/cm$^2$ (50 to 1000 cells/square inch), most preferably 15.5 to 93.0 cells/cm$^2$ (100 to 600 cells/square inch).

Moreover, the plugging member 3 for use in the plugged honeycomb structure 1 of the present embodiment has the convex portion 6 on the end portion on the side opposite to the end surface in which the cell 5 to be plugged is opened, and another constitution is preferably similar to that of the plugging member for use in the known conventional plugged honeycomb structure.

As the material of the plugging member 3, the preferable examples of the material of the honeycomb structure 2 are preferably usable.

For example, it is preferable to use at least one selected from the group consisting of silicon carbide, a silicon-silicon carbide based composite material, silicon nitride, cordierite, mullite, alumina, spinel, a silicon carbide-cordierite based composite material, a silicon-silicon carbide composite material, lithium aluminum silicate, aluminum titanate and an Fe—Cr—Al based metal. It is further preferable to use the same material as that constituting the honeycomb structure 2.

When the structure is constituted in this manner, thermal expansion coefficients of the honeycomb structure 2 and the plugging member 3 can be matched, and occurrence of cracks due to a thermal expansion difference can effectively be prevented.

When the openings of the cells 5 are plugged using such plugging members 3, the members are usually arranged so as to plug the openings of the cells in a zigzag manner, but a pattern to plug the cells 5 is not limited to this.

For example, although not shown, a plurality of plugged cells may be assembled, and a plurality of cells which are not plugged in one end surface may be assembled. Alternatively, the plugged cells may be assembled in rows, and the cells which are not plugged in one end surface may be assembled in rows.

Alternatively, the openings may be plugged so as to obtain a concentric circular pattern or a radial pattern, and various patterns can be formed in accordance with shapes of the cells.

Moreover, in the present embodiment, there have been described an integrally formed honeycomb structure in which the partition walls to define the cells are formed integrally with an outer wall, or a honeycomb structure in which the outer wall is separately formed in outer peripheral portions of the partition walls, but the present invention is applicable even to a honeycomb structure having a segment structure (honeycomb segments).

Here, a method of manufacturing the plugged honeycomb structure of the present embodiment will be described.

To manufacture the plugged honeycomb structure of the present embodiment, first a clay for forming a green body to prepare honeycomb structure is prepared.

This clay for forming a green body can be obtained by, for example, adding an additive such as a binder, a dispersant, a pore former or a surfactant, water as a solvent and the like to powder (material powder) of the material described above as the preferable material of the honeycomb structure; and mixing and kneading the material.

Examples of the binder may include hydroxypropyl methyl cellulose, methyl cellulose, hydroxyethyl cellulose, carboxyl methyl cellulose, polyvinyl alcohol and polyethylene terephthalate, and the like. Examples of the dispersant may include ethylene glycol, dextrin, fatty acid soap and polyalcohol, and the like. Examples of the pore former may include graphite, cokes, flour, starch, a foaming resin, a water absorbing resin, a phenol resin, polyethylene terephthalate, a fly ash balloon, a silica gel, an organic fiber, an inorganic fiber and a hollow fiber, and the like.

One of these additives alone or a combination of two or more additives may be used in accordance with a purpose.

As to this clay for forming a green body, it is usually preferable to introduce about 10 to 40 parts by mass of water to 100 parts by mass of mixed material powder including the above material powder and the additive added if necessary.

Next, the resultant clay for forming a green body is formed to obtain a formed green honeycomb body (a non-fired honeycomb structure).

Examples of a forming method may include extrusion forming, and the forming can be performed using a vacuum kneader, a ram type extrusion molder, a biaxial screw type continuous extrusion molder or the like.

An outer shape of the formed green honeycomb body can be determined in accordance with a shape of the honeycomb structure to be manufactured. Examples of a sectional shape vertical to a central axis may include a polygonal shape such as a quadrangular shape, a circular shape, an elliptic shape, an oblong shape and an irregular shape, and the like.

Next, the resultant formed green honeycomb structure body is dried.

As drying means, various methods can be performed, and examples of the method may include hot air drying, microwave drying, dielectric drying, pressure reduction drying and freeze drying, and the like.

Above all, it is preferable to use at least one drying method selected from the group consisting of the dielectric drying, the microwave drying and the hot air drying.

Moreover, as drying conditions, it is preferable to dry the honeycomb body at 30 to 150° C. for one minute to two hours.

Here, both end surfaces of the dried formed green honeycomb body are cut into a predetermined length if necessary.

Next, a plugging slurry which is a raw material of the plugging member is prepared.

The plugging slurry can be obtained by adding an additive such as a binder, a dispersant, a pore former or a surfactant to powder (material powder) of the raw material described above as the preferable material of the plugging member as needed; adding water as a solvent to the mixture so as to obtain a slurry form; and then kneading the material by use of a mixer or the like.

When the plugged honeycomb structure of the present embodiment is manufactured, this plugging slurry is prepared so that a moisture amount of the slurry is smaller than that of a plugging slurry heretofore used, and a surface tension of the plugging slurry is reduced.

In a case where the formed green honeycomb body is constituted in this manner, when the openings of the cells of the formed green honeycomb body are filled with the plugging slurry, an apical end portion of the plugging slurry (i.e., the end portion of the plugging member on the side opposite to the end surface in which the cell to be plugged is opened) has a shape convex toward the center of the cell in the axial direction.

It is to be noted that it is possible to use an additive to be added in preparing the plugging slurry which is similar to the additive used in the clay for forming a green body to form the formed green honeycomb body. Examples of the binder include hydroxypropyl methyl cellulose, methyl cellulose, hydroxyethyl cellulose, carboxyl methyl cellulose, polyvinyl alcohol and polyethylene terephthalate, and the like. Examples of the dispersant may include ethylene glycol, dextrin, fatty acid soap and polyalcohol, and the like. Examples of the pore former may include graphite, cokes, flour, starch, a foaming resin, a water absorbing resin, a phenol resin, polyethylene terephthalate, a fly ash balloon, a silica gel, an organic fiber, an inorganic fiber and a hollow fiber, and the like.

One of these additives alone or a combination of two or more additives may be used in accordance with a purpose.

Next, in one end surface of the formed green honeycomb body (e.g., the one end surface 7a of the honeycomb structure 2 shown in FIG. 1), the openings of the cells (e.g., the remaining cells 5b of the honeycomb structure 2 shown in FIG. 1) other than the cells whose openings to be plugged (e.g., the predetermined cells 5a of the honeycomb structure 2 shown in FIG. 1) are masked. The end surface of the honeycomb body is immersed into a storage container in which the above plugging slurry is stored to fill the openings of the predetermined cells in the one end surface with the plugging slurry.

Subsequently, in the other end surface of the formed green honeycomb (e.g., the other end surface 7b of the honeycomb structure 2 shown in FIG. 1), the cells which are not masked in the one end surface (e.g., the remaining cells 5b of the honeycomb structure 2 shown in FIG. 1) are masked. This end surface of the honeycomb body is immersed into the storage container in which the above plugging slurry is stored to fill the remaining cells in the other end surface with the plugging slurry.

A plugged formed green honeycomb body is obtained in this manner in which the openings of the predetermined cells and the remaining cells of the formed green honeycomb body are filled with the plugging slurry.

As described above, this plugging slurry is prepared so that the moisture amount is smaller than that of the plugging slurry heretofore used. Therefore, when the openings of the cells are filled with the plugging slurry, the apical end portion of the plugging slurry (i.e., the end portion of the plugging member on the side opposite to the end surface in which the cell to be plugged is opened) has a shape convex toward the center of the cell in the axial direction.

This convex shape forms the convex portion of the plugging member.

There is not any special restriction on a method of masking the openings of the cells. Examples of the method may include a method of attaching an adhesive film to the whole end surface of the formed green honeycomb body; and making a hole in a predetermined portion of the attached adhesive film to form a mask, and the like.

More specifically, it is possible to preferably use a method of attaching the adhesive film to the whole end surface of the honeycomb structure; and then making the hole in an only portion corresponding to the cell whose opening is to be plugged by use of laser or the like.

As the adhesive film, it is possible to preferably use a film which is made of polyester, polyethylene or a resin such as a thermosetting resin and whose one surface is coated with an adhesive or the like.

Moreover, a method of forming the plugging member is not limited to a method of filling the opening of the cell with the above plugging slurry. For example, there may be used a method of preparing beforehand each plugging member that has the convex portion formed on one end portion by use of a material such as a ceramic in accordance with a size of the opening of the cell; and arranging and fixing the plugging members to the openings of the predetermined cells and the remaining cells of the formed green honeycomb body.

It is to be noted that in a case where the above plugging members are prepared beforehand and arranged in the openings of the cells, since the formed green honeycomb body is a green body formed of a sticky clay, the plugging members can be fixed to the openings of the cells by simply fitting the plugging members into the openings of the cells.

Next, the plugged formed green honeycomb body obtained in this manner is dried.

There is not any special restriction on this drying step, but as compared with a conventional manufacturing method, it is preferable that a temperature rise speed is increased to complete the drying before deformation (shrinkage) due to the drying of the filled plugging slurry occurs.

In consequence, it is possible to dry the filled plugging slurry or the like while the convex shapes of the end portions of the members are retained. Therefore, the plugging members including the convex portions having satisfactory shapes can be formed.

After drying the plugged formed green honeycomb body in this manner, the honeycomb body is heated and fired at a predetermined temperature. In consequence, the plugged honeycomb structure of the present embodiment is manufactured.

As conditions of the firing, optimum conditions can appropriately be set in accordance with a type of the material powder used in the clay for forming a green body. For example, it is preferable that the honeycomb body is fired in an outside air atmosphere at 1350 to 1450° C. for one to 20 hours.

It is to be noted that to manufacture the plugged honeycomb structure of the present embodiment, for example, the formed green honeycomb body may be fired once before the openings of the cells of the formed green honeycomb body are filled with the plugging slurry. The openings of the cells of the formed green honeycomb body fired beforehand may be filled with the plugging slurry, and the filled plugging slurry may be dried and fired again to manufacture the plugged honeycomb structure.

Moreover, in a stage in which the plugged formed green honeycomb body is obtained, the honeycomb body may be calcined to be degreased. After the calcining, the firing may be performed.

As described above, as shown in FIGS. 1 to 3, it is possible to manufacture the plugged honeycomb structure in which at least one plugging member (the first plugging member) may include the convex portion having the shape convex toward the center of the cell in the axial direction on the end portion on the side opposite to the end surface where the cell to be plugged is opened.

Needless to say, in the above manufacturing method, the plugged honeycomb structure may be manufactured in which both of the first plugging member and the second plugging member include the convex portions having the shapes convex toward the centers of the cells in the axial direction on the end portions of the members on the side opposite to the end surface where the cells to be plugged are opened.

It is to be noted that the method of manufacturing the plugged honeycomb structure of the present embodiment is not limited to the above manufacturing method.

For example, to obtain the honeycomb structure (or the formed green honeycomb body), instead of preparing an integrally formed honeycomb structure in which the partition walls to define the cells and the outer wall are integrally formed or a honeycomb structure in which the outer wall is separately formed in the outer peripheral portions of the partition walls, for example, a honeycomb structure (honeycomb segments) having a segment structure may be prepared. The openings of the cells of the structure may be filled with the plugging slurry to manufacture the plugged honeycomb structure.

EXAMPLES

The present invention will be described hereinafter in more detail in accordance with examples, but the present invention is not limited to the examples.

Example 1

In the present example, a plugged honeycomb structure was manufactured in which plugging members were arranged in openings of cells of a honeycomb structure article having honeycomb segments.

(Preparation of Honeycomb Segment)

As a raw material of the honeycomb segment, SiC powder and metal Si powder were mixed at a mass ratio of 80:20, starch and a foaming resin were added as pore formers to the mixed material, and further methyl cellulose, hydroxypropoxyl methyl cellulose, a surfactant and water were added to prepare a clay for forming a green body having plasticity.

Next, this clay for forming a green body was extruded, and dried with microwave and hot air to obtain a formed green honeycomb segment body in which a thickness of each partition wall was 310 μm, a cell density was about 46.5 cells/cm$^2$ (300 cells/square inch), a section was a square having one side of 35 mm and a length was 152 mm.

The plugging members were arranged in both end surfaces of the cells so that openings of predetermined cells on a side of one end surface and openings of remaining cells on a side of the other end surface of this formed green honeycomb segment body formed a checkered pattern.

Each plugging member was formed using the same material as that of the formed green honeycomb segment body, and it was formed beforehand into a columnar shape having an outer periphery whose area was approximately equal to an open area of the cell and having a convex portion on one end portion in accordance with a size of the opening of the cell. The resultant plugging members were arranged and fixed in the corresponding openings of the cells by use of pincers.

In the present example, a length (the length X in FIG. 3) from a bottom portion to a vertex portion of the convex portion of the plugging member was set to 0.5 mm.

It is to be noted that since the formed green honeycomb segment body was a body formed of a sticky clay, the plugging member was firmly fixed to the opening of the cell by only arranging the above plugging member to the opening of the cell, and the member did not drop from the opening.

Next, after drying the formed green honeycomb segment body provided with the plugging members, the body was degreased in an outside air atmosphere at about 400° C., and then fired in Ar inactive atmosphere at about 1450° C. to obtain a honeycomb segment having a porous structure in which SiC crystal particles were bonded with Si.

(Preparation of Bonding Material)

An alumino silicate fiber as an inorganic fiber, colloidal silica and a clay as inorganic binders and SiC as inorganic particles were mixed, and water was further added to the mixed material. When needed, an organic binder (CMC, PVA), a foaming resin or a dispersant was added to knead the material in a mixer for 30 minutes, and a pasted bonding material was obtained.

(Preparation of Plugged Honeycomb Structure)

An outer wall surface of the honeycomb segment was coated with the bonding material so as to obtain a thickness of about 1 mm, and a bonding material layer was formed.

Subsequently, a step of laminating another honeycomb segment on the coated surface was repeated, a laminated honeycomb segment body constituted of 16 honeycomb segments was prepared, a pressure was applied from the outside, and the whole body was bonded. Subsequently, the body was dried at 140° C. for two hours to obtain a bonded honeycomb segment body.

Subsequently, an outer periphery of the bonded honeycomb segment body was ground into a cylindrical shape, coated with a coating material, and dried and hardened at 700° C. for two hours to obtain a plugged honeycomb structure.

The plugged honeycomb structure obtained in this manner was subjected to an air channel experiment using an evaluation reference air channel to measure a pressure loss. Measurement results are shown in Table 1.

In the air channel experiment, the measurement was performed using a pressure loss measurement device of a filter described in Japanese Patent Application Laid-Open No. 2005-172652.

In the air channel experiment, a flow rate of a fluid was set to 10 Nm$^3$/min, and a temperature during the experiment was set to 25° C.

TABLE 1

|  |  | Length from bottom portion to vertex portion of convex portion | Presence of curvature in convex portion | Pressure loss [kPa] | Reduction ratio [%] |
| --- | --- | --- | --- | --- | --- |
| Example 1 | Convex portion | 0.5 mm | Without curvature | 4.36 | 1.0 |
| Example 2 | Convex portion | 1.0 mm | Without curvature | 4.33 | 1.5 |
| Example 3 | Convex portion | 2.5 mm | Without curvature | 4.20 | 4.5 |
| Example 4 | Convex portion | 0.5 mm | With curvature | 4.33 | 1.5 |
| Example 5 | Convex portion | 1.0 mm | With curvature | 4.29 | 2.5 |
| Comparative Example 1 | Flat | 0 mm | — | 4.40 | — |
| Comparative Example 2 | Concave portion | −0.5 mm | — | 4.44 | −0.8 |

Examples 2 to 5

Plugged honeycomb structures were manufactured by materials and methods similar to those of Example 1 except that a length from a hem portion to a vertex portion of a convex portion of a plugging member was set to 1.0 mm (the convex portion did not have any curvature) in Example 2, the length was set to 2.5 mm (the convex portion did not have any curvature) in Example 3, the length was set to 0.5 mm (the convex portion had a curvature) in Example 4, and the length was set to 1.0 mm (the convex portion had a curvature) in Example 5. Pressure losses of the plugged honeycomb structures were measured by a method similar to that of Example 1.

Measurement results are shown in Table 1.

Comparative Examples 1 and 2

Plugged honeycomb structures were manufactured by materials and methods similar to those of Example 1 except that an end portion of a plugging member on a side opposite to an end surface in which a cell to be plugged was opened was formed to be flat in Comparative Example 1, and the end portion was formed into a concave portion recessed inwardly (a length from a hem portion to a vertex portion was –0.5 mm) unlike Example 1. Pressure losses of the plugged honeycomb structures were measured by a method similar to that of Example 1.

Measurement results are shown in Table 1.

Moreover, there was calculated a ratio (a reduction ratio) of a value obtained by subtracting values of the pressure losses of Examples 1 to 5 and Comparative Example 2 from a value of the pressure loss of Comparative Example 1 in a case where it was assumed that the pressure loss of Comparative Example 1 was 100%. Results are shown in Table 1.

In the plugged honeycomb structures of Examples 1 to 5, as compared with the plugged honeycomb structure of Comparative Example 1 of a conventional technology, a rise of the pressure loss was suppressed, and the reduction ratio indicated a positive value.

Moreover, when the presence of the curvature of the convex portion was compared, the rises of the pressure losses were more suppressed in the plugged honeycomb structures (Examples 4 and 5) including the plugging members having the curvatures.

Furthermore, in the plugged honeycomb structure of Comparative Example 2 including the plugging members having the concave portions recessed inwardly, the rise of the pressure loss increased, and the reduction ratio indicated a negative value.

A plugged honeycomb structure of the present invention is useful as a trapping filter for an exhaust gas, such as a diesel particulate filter (DPF) for trapping and removing particulate matter (particulate) included in the exhaust gas from a diesel engine or the like.

What is claimed is:

1. A plugged honeycomb structure comprising:
    a columnar honeycomb structure having porous partition walls and a plurality of cells which are defined by the partition walls and which extend through the structure from one end surface to the other end surface thereof;
    a plurality of first plugging members which plug openings of predetermined cells on a side of the one end surface; and
    a plurality of second plugging members which plug openings of the remaining cells on a side of the other end surface,
    the columnar honeycomb structure and the plurality of first and second plugging members being fired,
    wherein the first plugging member on the side of the one end surface includes a convex portion having a shape convex toward the center of the cell in an axial direction on an end portion of the member on a side opposite to the end surface in which the cell to be plugged is opened, and
    the length of said convex portion in the axial direction from a hem portion thereof to a vertex portion thereof is 0.1 mm or more and less than 3 mm.

2. The plugged honeycomb structure according to claim 1, wherein the convex portion of the first plugging member is constituted of a curved surface having a predetermined curvature, and has the shape which is convex toward the center of the cell in the axial direction.

3. The plugged honeycomb structure according to claim 1, wherein the second plugging member on the side of the other end surface includes a convex portion having a shape convex toward the center of the cell in the axial direction on an end portion of the member on a side opposite to the end surface in which the cell to be plugged is opened.

4. The plugged honeycomb structure according to claim 3, wherein the convex portion of the second plugging member is constituted of a curved surface having a predetermined curvature, and has the shape which is convex toward the center of the cell in the axial direction.

5. The plugged honeycomb structure according to claim 2, wherein a length from a hem portion to a vertex portion of the convex portion is larger than 0 mm, and smaller than 3 mm.

6. The plugged honeycomb structure according to claim 5, wherein a length from a hem portion to a vertex portion of the convex portion is larger than 0 mm, and smaller than 1 mm.

7. The plugged honeycomb structure according to claim 4, wherein a length from a hem portion to a vertex portion of the convex portion is larger than 0 mm, and smaller than 3 mm.

8. The plugged honeycomb structure according to claim 7, wherein a length from a hem portion to a vertex portion of the convex portion is larger than 0 mm, and smaller than 1 mm.

* * * * *